United States Patent [19]

Matsumoto et al.

[11] 3,875,170

[45] Apr. 1, 1975

[54] PYRIDINE BIS (DITHIOCARBAMATE) DERIVATIVES

[75] Inventors: Ikyo Matsumoto; Kanji Nakagawa; Meiki Matsuzaki; Kenji Horiuchi, all of Tokyo, Japan

[73] Assignees: Banyu Pharmaceutical Co., Ltd., Tokyo, Japan; Hidaka Hiroyoshi, Mezon-Torisu, Tokyo, Japan

[22] Filed: Dec. 18, 1973

[21] Appl. No.: 425,721

Related U.S. Application Data

[62] Division of Ser. No. 254,943, May 19, 1972, Pat. No. 3,810,900.

[30] Foreign Application Priority Data

May 25, 1971 Japan............................ 46-35133

[52] U.S. Cl.... 260/293.69, 260/247.1, 260/294.8 E, 424/248, 424/263
[51] Int. Cl. ...................... C07d 29/10, C07d 31/50
[58] Field of Search ................. 260/294.8 E, 293.69

[56] References Cited
UNITED STATES PATENTS

| | | | |
|---|---|---|---|
| 3,290,319 | 12/1966 | Partyka......................... | 260/294.8 E |
| 3,467,663 | 9/1969 | Inoue et al. ................... | 260/294.8 E |
| 3,784,632 | 1/1974 | Matsumoto et al............ | 260/293.69 |

*Primary Examiner*—Alan L. Rotman
*Attorney, Agent, or Firm*—Oblon, Fisher, Spivak, McClelland & Maier

[57] ABSTRACT

Pyridine bis(dithiocarbamate) derivatives having the formula:

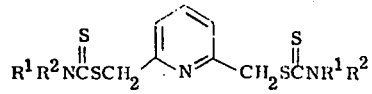

wherein $R^1$ represents a lower alkyl group or a lower alkene group or a phenyl group and $R^2$ represents a hydrogen atom or a lower alkyl group, or $R^1$ and $R^2$ taken together may form a heterocyclic ring with the nitrogen atom, has been prepared by reacting 2,6-bis(-halomethyl)pyridine with a metal salt or amine salt of dithiocarbamic acid having the formula:

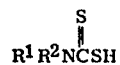

, or with carbon bisulfide and an amine having the formula:

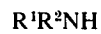

, or by reacting 2,6-bis-(mercaptomethyl)pyridine with an isothiocyanate of the formula:

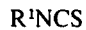

These pyridine bis(dithiocarbamate) derivatives exhibit physiological effects on the circulatory system and demonstrate anti-hypertensive and anti-inflammatory properties.

5 Claims, No Drawings

PYRIDINE BIS (DITHIOCARBAMATE) DERIVATIVES

This is a division, of application Ser. No. 254,943, filed May 19, 1972, now U.S. Pat. No. 3,810,900 dated May 14, 1974.

BACKGROUND OF THE INVENTION

FIELD OF THE INVENTION

This invention relates to pyridine bis(dithiocarbamate) derivatives and to a method for preparing same, which are useful as agents having physiological activity and can be used for the treatment of disorders of the circulatory system and particularly for the treatment of hypertension. These derivatives have also beeen found to be useful for the treatment of mental disease, particularly schizophrenia.

SUMMARY OF THE INVENTION

Accordingly, it is one object of this invention to provide a process for preparing pyridine bis(dithiocarbamate) derivatives which are useful for the treatment of mental disorders and for circulatory disorders.

This and other objects, as will hereinafter become more readily apparent, have been attained by the provision of pyridine bis(dithiocarbamate) derivatives of the formula:

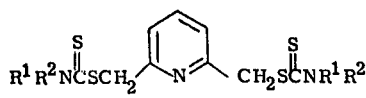

wherein $R^1$ represents a lower alkyl group, a lower alkene group, or a phenyl group and $R^2$ represents a hydrogen atom or a lower alkyl group or $R^1$ and $R^2$ taken together may form a heterocyclic ring with the nitrogen atom.

DETAILED DESCRIPTION OF THE PREFERRED EMBODIMENTS

Pyridine bis(dithiocarbamate) derivatives having the formula:

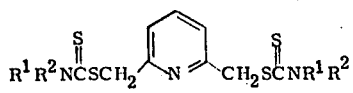 (I)

wherein $R^1$ represents a lower alkyl group or a lower alkene group or a phenyl group and $R^2$ represents a hydrogen atom or a lower alkyl group, or $R^1$ and $R^2$ taken together may form a heterocyclic ring with the nitrogen atom, can be prepared by several procedures.

1. They can be prepared by reacting 2,6-bis(halomethyl)pyridine having the formula:

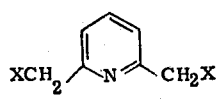 (II)

wherein X represents a halogen atom, with a metal salt or an amine salt of dithiocarbamic acid of the formula:

 (III)

2. Alternatively, the pyridine bis(dithiocarbamate) derivative can be prepared by reacting 2,6-bis(halomethyl) pyridine of the formula:

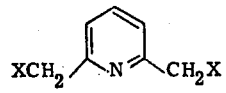 (II)

wherein X represents a halogen atom, with carbon bisulfide and an amine having the formula:

(IV)

3. Another alternative route for providing pyridine bis(dithiocarbamate) derivatives is to react a 2,6-bis(mercaptomethyl) pyridine of the formula:

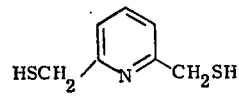

with an isothiocyanate of the formula:

$R^1NCS$ wherein $R^1$ represents a lower alkyl or a lower alkene or a phenyl group.

In the first reaction scheme, the metal salt or amine salt of the dithiocarbamic acid having the formula:

 (III)

is S-alkylated with a 2,6-bis(halomethyl) pyridine of the formula:

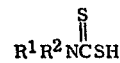 (II)

wherein X represents a halogen atom, in accordance with the reaction mechanism

Compound (II) + 2 [$R^1R^2NC(:S)S$]$^-$ $Q^+$ → I + 2QX wherein $Q^+$ represents a metal or an amine cation.

This same type of S-alkylation can be carried out directly by reacting carbon disulfide with an amine having the formula:

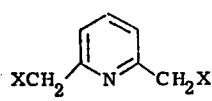

(IV)

and with a halide compound (II), according to the reaction mechanism

Compound (II) + 2CS$_2$ + 4$R^1R^2$NH → Compound I + 2$R^1R^2$NH.HX.

In this reaction, it is possible to convert up to 2 moles of the amine to an inorganic alkali salt (see Example 3). This latter modification is an advantageous alternative because it eliminates the necessity of using dithiocarbamate, which is rather unstable.

The substituent group $R^1$ in the compound (I) may be a wide variety of alkyl or alkene groups, but preferably is methyl, ethyl, propyl, isopropyl, allyl, phenyl or tolyl.

The substituent group R² includes preferably hydrogen, methyl or ethyl, and when R¹ and R² together forms a heterocyclic ring with a nitrogen atom, the ring is preferably pyrrolidine, piperidine, hexahydroazepine and morpholine.

The substituent group X in the starting compound (II) can be any halogen, particularly chlorine, bromine or iodine.

The reactant dithiocarbamate of the formula (III), can be easily prepared by reacting 2 equivalents of an amine having formula (IV) with carbon bisulfide, as follows:

In some instances, it may be desirable to replace 1 equivalent of an amine with another base, such as an alkali hydroxide, ammonium hydroxide, or triethylamine. When 1 equivalent of sodium hydroxide is used, a sodium salt of the dithiocarbamate will be prepared, as follows:

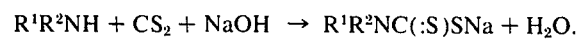

It is also possible to use Ag, Zn, Mn or Pb salts of dithiocarbamic acid, which are formed by substituting the dithiocarbamate cation with said metal ion, and to use these salts as S-alkylation reagents.

It is preferable to use an inert, neutral solvent, which is capable of dissolving the halide (II) in the reaction of the halide (II) with the metal salt or amine salt of dithiocarbamic acid (III). Suitable solvents include acetone, dimethylformamide, ethyl acetate or a lower alcohol. The reaction may be carried out in a two-phase system by dissolving the halide in benzene and then using an aqueous solution of the dithiocarbamate.

The reaction usually goes to completion at about 0°C. within a relatively short period of time. Such lower temperatures are desirable to prevent decomposition of the dithiocarbamate. Lower temperatures are also desirable to prevent reaction of the halide (II) with the amine.

Similar reaction conditions may be used, even if the halide (II) is reacted directly with the carbon bisulfide and the amine. The pyridine bis-(dithiocarbamate) derivatives formed herein, is recoverable in the form of sparingly, water-soluble crystals which can be easily purified by conventional recrystallizing techniques using an organic solvent.

Referring to the third method of preparing the pyridine bis-(dithiocarbamate) derivative of the formula (I), wherein R² is a hydrogen atom, this reaction can be effected by reacting a 2,6-bis(mercaptomethyl) pyridine with an isothiocyanate of the formula:

R¹NCS wherein R¹ may be a lower alkyl, lower alkene, or phenyl such as methyl, ethyl, propyl, isopropyl, allyl, phenyl or tolyl.

This reaction can be effected in an inert organic solvent, as a homogeneous system using such solvents as benzene, toluene, chlorobenzene, chloroform, methylenechloride, acetonitrile, or pyridine. The addition reaction of the isothiocyanate to the thio groups of 2,6-bis(mercaptomethyl) pyridine, can be easily carried out without a catalyst.

The reaction period can be shortened, howevever, by application of heat, conveniently by the use of a water bath. When the solvent is distilled from the reaction mixture, a compound of the formula (I) can be obtained at high yields.

The compound can be purified by recrystallization, or the hydrochloride thereof can be recovered in a suitable solvent.

The pyridine bis(dithiocarbamate) derivatives of this invention have been shown to be effective in the treatment of circulatory disorders such as hypertension and also for the treatment of mental disorders such as schizophrenia. The administration of this compound i.p (25 mg/kg) reduced the blood pressure by 30 percent in spontaneously hypertensive rats. The reduction of blood pressure continued for at least 6 hours. The endogenous norepinephrine content in the adrenal gland following oral administration decreased 20 percent as compared to a control.

Having generally described the invention, a more complete understanding can be attained by reference to certain specific Examples which are provided herein for purposes of illustration only and are not intended to be construed as limiting unless otherwise specifically specified.

EXAMPLE 1

1.5 g. of N-methyldithiocarbamate triethylamine salt was suspended in 10 ml. of acetone at 0° - 5°C. while stirring. 1.0 g. of 2,6-bis(bromomethyl) pyridine was dissolved in 10 ml. of acetone and the solution was added dropwise to said suspension. The mixture was stirred at this temperature for 30 minutes. The reaction mixture was diluted with water to precipitate crystals. When the crystals were recrystallized from benzene, 1.16 g. (yield 96.7 percent) of bis-(N-methyldithiocarbamate) derivative having the following formula, which is in a form of colorless needle-like crystals and having a melting point of 116° - 117°C. was obtained.

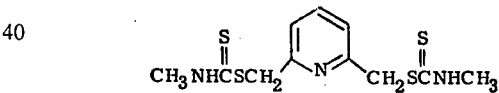

| Elementary Analysis | | $(C_{11}H_{15}N_3S_4)$ | | |
|---|---|---|---|---|
| | C | H | N | S |
| Calculated value | 41.64% | 4.77% | 13.25% | 40.35% |
| Analyzed value | 41.66% | 4.75% | 12.95% | 40.53% |

The hydrochloride of said compound had a melting point (decomposition) of 177°C.

Triethylamine N-methyldithiocarbamate was prepared by mixing 10.8 g. of carbon bisulfide with 14.3 g. of triethylamine while stirring at 0°C. 16.5 ml. of 26percent methylamine methanol solution was added, dropwise, to said mixture and then the precipitate was recrystallized from methanol-isopropyl ether to yield 17.3 g. of crystals having a melting point (decomposition) of 115°C. The acute toxicity of the resulting bis(N-methyldithiocarbamate) derivative was quite low, i.e., intraperitoneal LD50 of 1500 mg/kg in mice.

The pharmacological tests evidenced quite significant anti-hypertensive activity and anti-inflammatory activity.

When the compound (50 mg/kg) was intraperitoneally injected to spontaneously hypertensive rats, a 30 percent reduction in blood pressure was observed.

The dose producing 50 percent fatalities in mice was higher than 3 mg/kg. The desirable effects of this drug was observable for up to 6 hours after administration.

EXAMPLE 2

1.7 g. of potassium N-methyldithiocarbamate was reacted with 1.0 g. of 2,6-bis(chloromethyl) pyridine in acetone at 0° – 5°C. 1.64 g. (yield 92 percent) of the bis(N-methyldithiocarbamate) derivative, having the formula stated in Example 1, in crystal form and having a melting point of 116° – 117°C. was obtained.

EXAMPLE 3

30 g. of 2,6-bis(chloromethyl) pyridine was dissolved in 250 ml. of acetone and 30 g. of carbon bisulfide was added and cooled while stirring. 15 g. of sodium hydroxide was dissolved in 50 ml. of water and was admixed with 45 g. of a 30 percent methylamine aqueous solution at moderately low temperatures.

The resulting solution was added, dropwise, to the first solution, while cooling to maintain the temperature at 0° - 5°C., since the reaction was exothermic. When the mixture was stirred for 1 hour at this temperature, a spot of the 2,6-bis(chloromethyl) pyridine starting material disappeared during thin layer chromatographic analysis.

500 ml. of water was added to the reaction mixture to precipitate crystals. When the resulting product was recrystallized from methanol, 52 g. (yield 96.5 percent) of bis(N-methyldithiocarbamate) derivative having the formula stated in Example 1 in the form of crystals having a melting point of 116° – 117°C. was obtained.

EXAMPLE 4

1.1 g. of sodium N-ethyldithiocarbamate was suspended in 10 ml. of acetone and was reacted with 1.0 g. of 2,6-bis(chloromethyl) pyridine at 0° – 5°C. for 1 hour. The resulting product had the following formula and was converted to the hydrochloride salt thereof to yield 1.36 g. of crystals having a melting point of 137°C.:

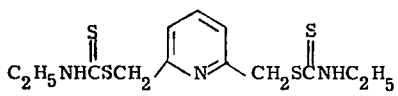

| Elementary Analysis | | ($C_{13}H_{19}N_3S_4$ ·HCl) | | |
|---|---|---|---|---|
| | C | H | N | S | Cl |
| Calculated value | 40.87% | 5.28% | 11.00% | 33.57% | 9.28% |
| Analyzed value | 40.64% | 5.09% | 11.04% | 33.35% | 9.08% |

EXAMPLE 5

1.2 g. of sodium N-isopropyldithiocarbamate was suspended in 10 ml. of acetone and was reacted with 1.0 g. of 2,6-bis(bromomethyl) pyridine at 0°–5°C. for 1 hour. When the product was recrystallized from methanol, 1.23 g. (yield 91.5%) of bis(N-isopropyldithiocarbamate) derivative having the following formula, in the form of colorless needle-like crystals, having a melting point of 103°C. was obtained:

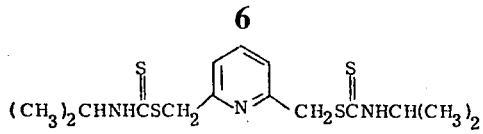

| Elementary Analysis | | ($C_{15}H_{23}N_3S_4$) | | |
|---|---|---|---|---|
| | C | H | N | S |
| Calculated value | 48.25% | 6.21% | 11.26% | 34.28% |
| Analyzed value | 48.19% | 6.32% | 11.39% | 34.04% |

The sodium N-isopropyldithiocarbamate was prepared by dissolving 3.45 g. of sodium hydroxide in 5 ml. of water and then adding 6.5 g. of carbon bisulfide after cooling and adding thereto, dropwise, a solution of 5 g. of isopropylamine in 10 ml. of acetone. The mixture was reacted at room temperature for 1 hour, and was filtered and washed with acetone, to yield 13.3 g. (yield 100%) of crystals having a melting point (decomposition) of 138°C.

EXAMPLE 6

1.3 g. of potassium N-allyldithiocarbamate was suspended in acetone while stirring, and was reacted with 1.0 g. of 2,6-bis(bromomethyl) pyridine at 0°–5°C. for 1 hour. When the product was recrystallized from ethyl acetate-hexane, 1.24 g. (yield 96%) of a compound having the following formula, in the form of crystals having a melting point of 87°C. was obtained.

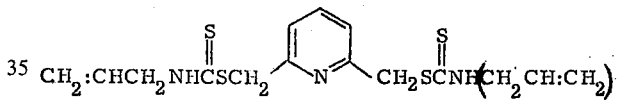

| Elementary Analysis | | ($C_{13}H_{19}N_3S_4$) | | |
|---|---|---|---|---|
| | C | H | N | S |
| Calculated value | 48.74% | 5.18% | 11.37% | 34.70% |
| Analyzed value | 48.59% | 5.11% | 11.46% | 34.65% |

EXAMPLE 7

1.6 g. of ammonium N-phenyldithiocarbamate was reacted with 1.0 g. of 2,6-bis(bromomethyl) pyridine in acetone at 0° – 5°C. for 1 hour to attain S-alkylation. When the product was recrystallized from benzene, 1.47 g. (yield 92%) of the compound of the following formula, in the form of colorless needle-like crystals having a melting point of 112.5°C. was obtained.

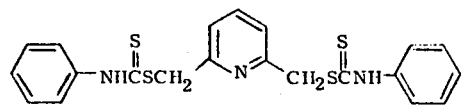

| Elementary Analysis | | ($C_{21}H_{19}N_3S_4$) | | |
|---|---|---|---|---|
| | C | H | N | S |
| Calculated value | 57.11% | 4.34% | 9.51% | 29.04% |
| Analyzed value | 57.06% | 4.26% | 9.60% | 28.89% |

Ammonium N-phenyldithiocarbamate was prepared by mixing 10.8 g. of carbon bisulfide and 18 ml. of 28 percent aqueous ammonia solution while stirring and while cooling. 11.2 g. of aniline was added dropwise to effect precipitation. The mixture was reacted at room temperature for 30 minutes, and was filtered and washed with ethanol, to yield 21 g. (yield 91.5%) of crystals having a melting point (decomposition) of 95°C.

EXAMPLE 8

2.2 g. of sodium N,N-dimethyldithiocarbamate was reacted with 2.0 g. of 2,6-bis(bromomethyl) pyridine in acetone at 0° –5°C. for 1 hour to attain S-alkylation. When the product was recrystallized from ethyl acetate, 2.39 g. (yield 92%) of a compound having the following formula in the form of colorless needle-like crystals, having a melting point of 150° – 152°C. was obtained.

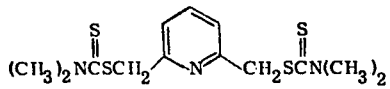

| Elementary Analysis | C | ($C_{13}H_{19}N_3S_4$) H N | | S |
|---|---|---|---|---|
| Calculated value | 45.21% | 5.55% | 12.17% | 37.07% |
| Analyzed value | 45.20% | 5.52% | 12.09% | 37.13% |

Sodium N,N-dimethyldithiocarbamate was prepared by mixing 10 g. of carbon bisulfide and 5.25 g. sodium hydroxide conc. aqueous solution while stirring and while cooling, 40 percent dimethylamine aqueous solution was added to the mixture to effect precipitation. 17 g. (yield 92%) of a compound having a melting point of 107° – 109°C. was obtained.

EXAMPLE 9

1.4 g. of sodium N,N-pentamethylenedithiocarbamate was reacted with 1.0 g. of 2,6-bis(bromomethyl) pyridine in acetone at 0° – 5°C. for 1 hour to achieve S-alkylation. When the product was recrystallized from ethyl acetate, 1.55 g. (yield 96.7%) of a compound having the following formula, in the form of colorless needle-like crystals, having a melting point of 98°–99°C. was obtained.

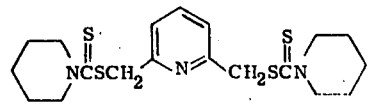

| Elementary Analysis | C | ($C_{19}H_{27}N_3S_4$) H N | | S |
|---|---|---|---|---|
| Calculated value | 53.64% | 6.40% | 9.88% | 30.09% |
| Analyzed value | 53.57% | 6.40% | 9.77% | 29.79% |

Sodium N,N-pentamethylenedithiocarbamate was prepared by dissolving 5.25 g. of sodium hydroxide in 25 ml. of distilled water and 10 g. of carbon bisulfide was added after cooling. 11.2 g. of piperidine was added dropwise to the mixture to effect precipitation. 23.4 g. (yield 9.7.5%) of a compound having a melting point (decomposition) of 275°C. was obtained.

EXAMPLE 10

11 g. of 2,6-bis(mercaptomethyl) pyridine was dissolved in 50 ml. of benzene and 11 g. of methylisothiocyanate was added to the solution and the mixture was heated to its reflux temperature for 4 hours. The reaction mixture was dried in vacuo. The residue was recrystallized from benzene to yield 20 g. (yield 98%) of pyridine dithiocarbamate derivative having the following formula in the form of a colorless needle-like crystals having a melting point of 117°C.:

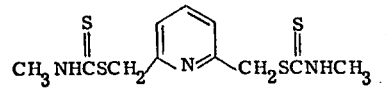

| Elementary Analysis | C | ($C_{11}H_{15}N_3S_4$) H N | | S |
|---|---|---|---|---|
| Calculated value | 41.64% | 4.77% | 13.25% | 40.35% |
| Analyzed value | 41.66% | 4.75% | 12.92% | 40.53% |

EXAMPLE 11

1 g. of 2,6-bis(mercaptomethyl)pyridine and 1.3 g. of ethylisothiocyanate were dissolved in 5 ml. of benzene and heated for 4 hours. The reaction mixture was concentrated under reduced pressure to yield 2.1 g. (yield 98%) pyridine dithiocarbamate of the following formula in the form of a colorless liquid having a boiling point of 120°–122°C./1 mmHg. When the distillate was cooled to below room temperature, the product was completely crystallized. When the hydrochloride of the resulting product was recrystallized from a methanolisopropyl ether mixture, colorless needle-like crystals having a melting point of 137°C. were obtained.

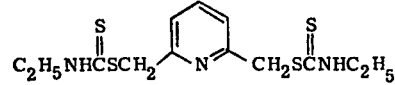

| Elementary Analysis | C | H | ($C_{13}H_{19}N_3S_4 \cdot HCl$) N | S | Cl |
|---|---|---|---|---|---|
| Calculated value | 40.87% | 5.28% | 11.00% | 33.5% | 9.28% |
| Analyzed value | 40.64% | 5.09% | 11.04% | 33.35% | 9.08% |

EXAMPLE 12

1.1 g. of 2,6-bis(mercaptomethyl)pyridine and 1.7 g. of isopropylisothiocyanate were dissolved in 6 ml. of benzene and the mixture was heated for 4 hours. When the solvent was distilled and the product was recrystallized from methanol, 2.3 g. (yield 91.5 percent) of pyridine dithiocarbamate derivative having the following formula in the form of prismatic crystals, having a melting point of 103°C. was obtained.

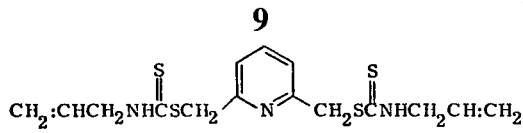

| Elementary Analysis | | ($C_{15}H_{23}N_3S_4$) | | |
|---|---|---|---|---|
| | C | H | N | S |
| Calculated value | 48.25% | 6.21% | 11.26% | 34.28% |
| Analyzed value | 48.19% | 6.32% | 11.39% | 34.04% |

EXAMPLE 13

1 g. of 2,6-bis(mercaptomethyl) pyridine and 1.2 g. of allylisothiocyanate were dissolved in 5 ml. of benzene and the mixture was heated for 4 hours. When the solvent was distilled and the product was recrystallized from an ethyl acetate-hexane mixture, 1.82 g. (yield 96%) of pyridine dithiocarbamate derivative having the following formula in the form of needle-like crystals, having a melting point of 87°C. was obtained.

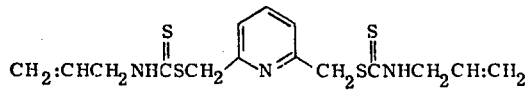

| Elementary Analysis | | ($C_{15}H_{19}N_3S_4$) | | |
|---|---|---|---|---|
| | C | H | N | S |
| Calculated value | 48.74% | 5.18% | 11.37% | 34.70% |
| Analyzed value | 48.59% | 5.11% | 11.46% | 34.65% |

EXAMPLE 14

0.4 g. of 2,6-bis(mercaptomethyl) pyridine and 0.8 g. of phenylisothiocyanate were dissolved in 2 ml. of benzene and the mixture was heated for 4 hours. When the solvent was distilled and the produce was recrystallized from benzene, 0.89 g. (yield 89.5%) of a pyridine dithiocarbamate derivative having the following formula in the form of needle-like crystals and having a melting point of 112°C. was obtained.

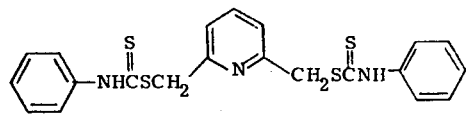

| Elementary Analysis | | ($C_{21}H_{19}N_3S_4$) | | |
|---|---|---|---|---|
| | C | H | N | S |
| Calculated value | 57.11% | 4.34% | 9.51% | 29.04% |
| Analyzed value | 57.06% | 4.26% | 9.60% | 28.89% |

Having now fully described the invention, it will be apparent to one of ordinary skill in the art that many changes and modifications can be made thereto without departing from the spirit or scope of the invention as set forth herein. ACCORDINGLY,

What is claimed and intended to be covered by letters patent is:

1. A pyridine bis(dithiocarbamate) derivative having the formula:

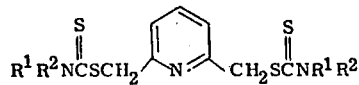

wherein $R^1$ represents lower alkyl, lower alkene group or phenyl and $R^2$ represents a hydrogen atom or a lower alkyl group or $R^1$ and $R^2$ taken togehter may form a piperidine ring with the nitrogen atom.

2. the pyridine bis(dithiocarbamate) derivative of claim 1, wherein $R^1$ is methyl and $R^2$ is hydrogen.

3. The pyridine bis(dithiocarbamate) of claim 1, wherein $R^1$ and $R^2$ taken together form a piperidine ring.

4. The pyridine bis(dithiocarbamate) of claim 1, wherein $R^1$ is allyl and $R^2$ is hydrogen.

5. The pyridine bis(dithiocarbamate) of claim 1, wherein $R^1$ is phenyl and $R^2$ is hydrogen.

* * * * *